United States Patent
Sakurai et al.

(10) Patent No.: US 11,746,308 B2
(45) Date of Patent: Sep. 5, 2023

(54) SOFT CONTACT LENS TREATMENT SOLUTION

(71) Applicant: NOF CORPORATION, Tokyo (JP)

(72) Inventors: Shunsuke Sakurai, Kawasaki (JP); Masatomo Takahashi, Oita (JP); Norio Iwakiri, Oita (JP); Koji Miyamoto, Kawasaki (JP); Takanori Fujita, Oita (JP)

(73) Assignee: NOF CORPORATION, Tokyo (JP)

( * ) Notice: Subject to any disclaimer, the term of this patent is extended or adjusted under 35 U.S.C. 154(b) by 494 days.

(21) Appl. No.: 16/767,370

(22) PCT Filed: Dec. 3, 2018

(86) PCT No.: PCT/JP2018/044333
§ 371 (c)(1),
(2) Date: May 27, 2020

(87) PCT Pub. No.: WO2019/111838
PCT Pub. Date: Jun. 13, 2019

(65) Prior Publication Data
US 2020/0385653 A1    Dec. 10, 2020

(30) Foreign Application Priority Data
Dec. 4, 2017 (JP) ................. 2017-232917

(51) Int. Cl.
C11D 3/00 (2006.01)
C08F 230/02 (2006.01)
C08L 43/02 (2006.01)
G02C 7/04 (2006.01)

(52) U.S. Cl.
CPC .......... C11D 3/0078 (2013.01); C08F 230/02 (2013.01); C08L 43/02 (2013.01); G02C 7/04 (2013.01)

(58) Field of Classification Search
CPC ...... C11D 3/0078; C08F 230/02; C08L 43/02; G02C 7/04
See application file for complete search history.

(56) References Cited

U.S. PATENT DOCUMENTS

2012/0026457 A1    2/2012  Qiu et al.
2015/0024987 A1 *  1/2015  Matsuoka ............ C11D 3/3773
                                              510/112

FOREIGN PATENT DOCUMENTS

| JP | 2012-088524 A | 5/2012 |
| JP | 2013-533518 A | 8/2013 |
| JP | 2017-146334 * | 8/2017 |
| JP | 2017-146334 A | 8/2017 |
| JP | 2017-151437 A | 8/2017 |
| WO | WO-2016145204 A1 * | 9/2016 ....... B29D 11/00038 |

OTHER PUBLICATIONS

Shujiro Sakaki, et al., A Water-Soluble Phospholipid Polymer as a New Biocompatible Synthetic DNA Carrier, 77 Bull. Chem. Soc. Jpn. 2283 (Year: 2004).*
Neha Buchar, et al, Detailed Study of the Reversible Addition-Fragmentation Chain Transfer Polymerization and Co-Polymerization of 2-methacryloyloxyethyl phosphorylcholine, 2 Polym. Chem. 632 (Year: 2011).*
Xiaojie Lin & Kazuhiko Ishihara, Water-Soluble Polymers Bearing Phosphorylcholine Group and Other Zwitterionic Groups for Carrying DNA Derivatives, 25 J Biomat. Sci, Polymer Ed. 1461 (Year: 2014).*
Gang Han, et al., Advanced Anti-Fouling Membranes for Osmotic Powder Generation from Wastewater via Pressure Retarded Osmosis, 52 Environ. Sci. Technol. 6686 (Year: 2018).*
International Search Report for PCT/JP2018/044333, dated Feb. 19, 2019.

* cited by examiner

*Primary Examiner* — Sean M Basquill
(74) *Attorney, Agent, or Firm* — Sughrue Mion, PLLC

(57) ABSTRACT

Provided is a treating solution for soft contact lenses capable of imparting hydrophilicity and sustainability thereof to a soft contact lens surface. It has been found that a treating solution for soft contact lenses containing a copolymer that contains two kinds of monomers different from each other as constituent units at a specific ratio, and that has a specific weight-average molecular weight can impart excellent hydrophilicity and sustainability thereof.

4 Claims, No Drawings

SOFT CONTACT LENS TREATMENT SOLUTION

CROSS REFERENCE TO RELATED APPLICATIONS

This application is a National Stage of International Application No. PCT/JP2018/044333 filed Dec. 3, 2018, claiming priority based on Japanese Patent Application No. 2017-232917 filed Dec. 4, 2017, which is incorporated herein by reference.

TECHNICAL FIELD

The present invention relates to a treating solution for soft contact lenses containing a copolymer having a specific structure.

BACKGROUND ART

Wearing sensation of a soft contact lens is considered to be caused by discomfort due to dryness of a surface of the soft contact lens, and technologies for eliminating this cause have heretofore been developed. For example, there have been developed: a technology involving subjecting a soft contact lens to plasma treatment (Patent Literature 1); a technology involving chemically bonding a soft contact lens having a reactive group and a hydrophilic polymer having a reactive group to each other to hydrophilize a surface of the soft contact lens (Patent Literature 2); and a technology involving blending polyethylene glycol, a cellulose-based polymer, or the like into a shipping solution for soft contact lenses to impart hydrophilicity to a soft contact lens surface or enhance hydrophilicity thereof, to thereby improve the wearing sensation (Patent Literatures 3 and 4).

However, each of the technologies of Patent Literature 1 and Patent Literature 2, which involves treating a soft contact lens itself to impart excellent hydrophilicity to a surface of the soft contact lens, includes complicated surface treatment steps. Accordingly, highly controlled production equipment is required, leading to an economic disadvantage in some cases. The technology of each of Patent Literatures 3 and 4 is simple, but involves bonding a compound to a surface of a soft contact lens through physical adsorption between the soft contact lens and the compound. Accordingly, although a certain effect is exhibited in terms of a temporary improvement in wearing sensation, a satisfying effect is not always obtained in terms of sustainability of satisfactory wearing sensation.

CITATION LIST

Patent Literature

[PTL 1] WO 2010/092686 A1
[PTL 2] WO 01/074932 A1
[PTL 3] WO 2009/032122 A1
[PTL 4] WO 2012/098653 A1

SUMMARY OF INVENTION

Technical Problem

There is no known treating solution for soft contact lenses capable of imparting more excellent hydrophilicity and sustainability thereof than a plasma or chemical surface treatment method.

In view of the foregoing, an object of the present invention is to provide a treating solution for soft contact lenses capable of imparting hydrophilicity and sustainability thereof to a soft contact lens surface.

Solution to Problem

The inventors of the present invention have made extensive investigations in order to achieve the above-mentioned object, and as a result, have found that a treating solution for soft contact lenses containing a copolymer that contains two kinds of different monomers as constituent units at a specific ratio, and that has a specific weight-average molecular weight can impart excellent hydrophilicity and sustainability thereof. Thus, the inventors have completed the present invention.

That is, the present invention is as described below.

1. A treating solution for soft contact lenses, including a copolymer (P) containing as constituent units 50 mol % to 99 mol % of a hydrophilic monomer represented by the formula (1a) and 1 mol % to 50 mol % of a positively charged monomer excluding the formula (1a), wherein the copolymer (P) has a weight-average molecular weight of from 10,000 to 5,000,000, and wherein a concentration of the copolymer (P) is from 0.001 w/v % to 15.0 w/v %:

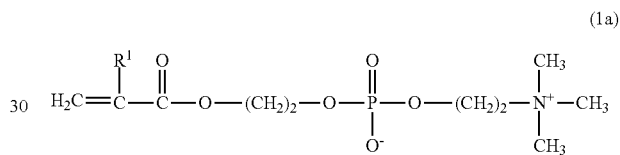

(1a)

in the general formula (1a), $R^1$ represents a hydrogen atom or a methyl group.

2. The treating solution for soft contact lenses according to the above-mentioned item 1, wherein the positively charged monomer excluding the formula (1a) is a monomer having at least one kind of any one of a primary amino group, a secondary amino group, a tertiary amino group, or a quaternary ammonium group.

3. The treating solution for soft contact lenses according to the above-mentioned item 1 or 2, wherein the hydrophilic monomer is 2-(methacryloyloxy)ethyl 2-(trimethylammonio)ethylphosphate, and the positively charged monomer is 2-aminoethyl methacrylate hydrochloride.

4. The treating solution for soft contact lenses according to the above-mentioned item 1 or 2, wherein the hydrophilic monomer is 2-(methacryloyloxy)ethyl 2-(trimethylammonio)ethylphosphate, and the positively charged monomer is dimethylaminoethyl methacrylate.

5. The treating solution for soft contact lenses according to the above-mentioned item 1 or 2, wherein the hydrophilic monomer is 2-(methacryloyloxy)ethyl 2-(trimethylammonio)ethylphosphate, and the positively charged monomer is 2-hydroxy-3-methacryloyloxypropyltrimethylammonium chloride.

6. The treating solution for soft contact lenses according to anyone of the above-mentioned items 1 to 5, wherein the treating solution for soft contact lenses is applied to soft contact lenses that belong to Group IV in a classification of contact lenses according to the U.S. Food and Drug Administration (FDA).

7. The treating solution for soft contact lenses according to anyone of the above-mentioned items 1 to 6, wherein the treating solution for soft contact lenses is a shipping solution for soft contact lenses.

8. The treating solution for soft contact lenses according to anyone of the above-mentioned items 1 to 6, wherein the treating solution for soft contact lenses is a care product for soft contact lenses.

9. A copolymer for a treating solution for soft contact lenses, including as constituent units 50 mol % to 99 mol % of a hydrophilic monomer represented by the formula (1a) and 1 mol % to 50 mol % of a positively charged monomer excluding the formula (1a), wherein the copolymer has a weight-average molecular weight of from 10,000 to 5,000,000:

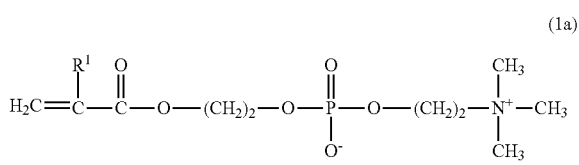

(1a)

in the general formula (1a), $R^1$ represents a hydrogen atom or a methyl group.

10. A soft contact lens treatment method, including using a copolymer (P) that contains as constituent units 50 mol % to 99 mol % of a hydrophilic monomer represented by the formula (1a) and 1 mol % to 50 mol % of a positively charged monomer excluding the formula (1a), and that has a weight-average molecular weight of from 10,000 to 5,000,000:

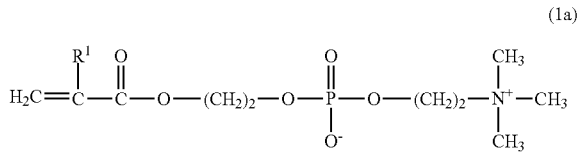

(1a)

in the general formula (1a), $R^1$ represents a hydrogen atom or a methyl group.

Advantageous Effects of Invention

According to the present invention, the treating solution for soft contact lenses excellent in safety and capable of imparting excellent hydrophilicity and sustainability thereof can be provided.

DESCRIPTION OF EMBODIMENTS

A treating solution for soft contact lenses of the present invention is a treating solution for soft contact lenses, including a copolymer (P) containing as constituent units 50 mol % to 99 mol % of a hydrophilic monomer represented by the following formula (1a) and 1 mol % to 50 mol % of a positively charged monomer excluding the formula (1a), wherein the copolymer (P) has a weight-average molecular weight of from 10,000 to 5,000,000, and wherein a concentration of the copolymer (P) is from 0.001 w/v % to 15.0 w/v %.

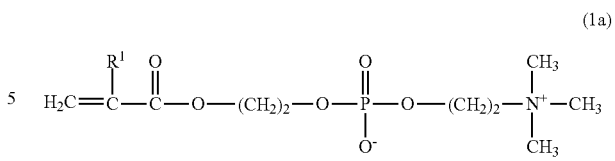

(1a)

In the general formula (1a), $R^1$ represents a hydrogen atom or a methyl group.

Configurations of the present invention are described below.

As used herein, the term "(meth)acrylate" means "acrylate or methacrylate", and the same applies to other similar terms.

In addition, herein, when preferred numerical ranges (e.g., the ranges of a concentration or a weight-average molecular weight) are described in stages, the respective lower limit values and upper limit values may be independently combined with each other. For example, in the description: "preferably 10 or more, more preferably 20 or more, and preferably 100 or less, more preferably 90 or less", the "preferred lower limit value: 10" and the "more preferred upper limit value: 90" may be combined to obtain a range of "10 or more and 90 or less". In addition, for example, also in the description: "preferably from 10 to 100, more preferably from 20 to 90", a range of "from 10 to 90" may be similarly obtained.

Specific product forms of the treating solution for soft contact lenses of the present invention may be as exemplified below. Specifically, there are given a shipping solution for soft contact lenses (soft contact lens packaging solution), a care product for soft contact lenses (soft contact lens multipurpose solution), a preserving solution for soft contact lenses, a cleaning solution for soft contact lenses, a cleaning/preserving solution for soft contact lenses, a soft contact lens disinfectant, an ophthalmic solution, a soft contact lens wetting solution, and the like. Of those, the treating solution for soft contact lenses is preferably used for a shipping solution for soft contact lenses or a care product for soft contact lenses.

Herein, the shipping solution for soft contact lenses refers to a solution to be included in a packaging container, such as a blister package, together with a contact lens in the distribution of soft contact lenses. In general, a soft contact lens is used in a state of being swollen with an aqueous solution, and hence the lens is packed into a packaging container in a state of being swollen with an aqueous solution at the time of shipping from a factory so as to be readily usable.

In addition, herein, the care product for soft contact lenses is not particularly limited as long as the care product for soft contact lenses is a solution to be used for the care of a soft contact lens product, but refers to, for example, a disinfecting solution, cleaning solution, preserving solution, cleaning/preserving solution, disinfecting/cleaning/preserving solution, and wetting solution for soft contact lenses. That is, the treating solution for soft contact lenses may be used as a solution to be brought into contact with a contact lens before the wearing of the contact lens, during the wearing thereof, or after the removal thereof.

<Copolymer (P)>

The copolymer (P) to be used for the treating solution for soft contact lenses of the present invention is obtained by polymerizing 50 mol % to 99 mol % of a hydrophilic monomer represented by the following formula (1a) and 1 mol % to 50 mol % of a positively charged monomer excluding the formula (1a), and has a weight-average molecular weight of from 10,000 to 5,000,000.

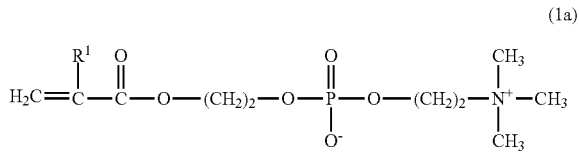

(1a)

In the general formula (1a), $R^1$ represents a hydrogen atom or a methyl group.

[Hydrophilic Monomer represented by General Formula (1a)]

The copolymer (P) to be used in the present invention contains the hydrophilic monomer represented by the following general formula (1a), that is, a monomer having a phosphorylcholine structure (hereinafter sometimes referred to as "hydrophilic monomer" or "PC monomer"). By virtue of the copolymer (P) containing the PC monomer, hydrophilicity is imparted to the copolymer (P), and hence excellent hydrophilicity can be imparted to a soft contact lens surface.

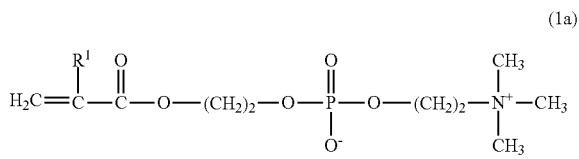

(1a)

In the general formula (1a), $R^1$ represents a hydrogen atom or a methyl group.

The PC monomer is 2-((meth)acryloyloxy)ethyl 2-(trimethylammonio)ethylphosphate, preferably 2-(methacryloyloxy)ethyl 2-(trimethylammonio)ethylphosphate represented by the following general formula (1a') (hereinafter sometimes referred to as "2-methacryloyloxyethyl phosphorylcholine").

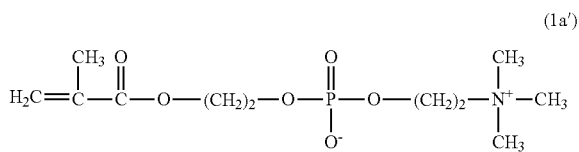

(1a')

The content of the PC monomer in the copolymer (P) is from 50 mol % to 99 mol %. When the content is less than 50 mol %, a hydrophilicity-improving effect on a soft contact lens surface cannot be expected, and when the content is more than 99 mol %, the amount of the positively charged monomer excluding the formula (1a) becomes relatively small, and hence the copolymer (P) cannot be expected to be adsorbed or bonded onto a soft contact lens through an electrical interaction.

From the above-mentioned viewpoint, the content of the PC monomer in the copolymer (P) is preferably 90.1 mol % or more, more preferably 92.5 mol % or more, still more preferably 92.5 mol % or more and 98.0 mol % or less.

[Positively Charged Monomer excluding Formula (1a)]

The copolymer (P) to be used in the present invention contains the positively charged monomer excluding the formula (1a) (hereinafter sometimes referred to as "positively chargedmonomer"). By virtue of the copolymer (P) containing the positively charged monomer excluding the formula (1a), an ability to adsorb or bond the copolymer (P) onto a soft contact lens surface through an electrical interaction can be imparted.

The positively charged monomer excluding the formula (1a) to be used in the present invention is a positively charged monomer having a polymerizable double bond in the molecule. Examples of the positively charged monomer include a monomer having a primary amino group, a monomer having a secondary amino group, a monomer having a tertiary amino group, and a monomer having a quaternary ammonium group.

Examples of the monomer having a primary amino group include (meth)acrylamide, allylamine, 2-aminoethyl (meth)acrylate, 2-methylallylamine, and 4-aminostyrene.

Examples of the monomer having a secondary amino group include N-methyl (meth)acrylamide, diacetone (meth)acrylamide, 3-phenyl (meth)acrylamide, N-phenyl (meth)acrylamide, N-propyl (meth)acrylamide, N-benzyl (meth)acrylamide, N-dodecyl (meth)acrylamide, N-t-butyl (meth)acrylamide, N-t-octyl (meth)acrylamide, N-isopropyl (meth)acrylamide, N-octadecyl (meth)acrylamide, N,3-diphenyl (meth)acrylamide, N-(butoxymethyl) (meth)acrylamide, N-(hydroxymethyl) (meth)acrylamide, 2-methyl-N-phenyl (meth)acrylamide, N-(2-iodophenyl) (meth)acrylamide, N-[3-(dimethylamino)propyl] (meth)acrylamide, and 2-(dimethylamino)ethyl (meth)acrylate {dimethylaminoethyl (meth)acrylate}.

Examples of the monomer having a tertiary amino group include N,N-diethyl (meth)acrylamide, N,N-dimethyl (meth)acrylamide, N,N-diisopropyl (meth)acrylamide, and dimethylaminoethyl methacrylate.

Examples of the monomer having a quaternary ammonium group include [3-((meth)acryloyloxyamino)propyl] trimethylammonium chloride, [2-((meth)acryloyloxy)ethyl] trimethylammonium chloride, and 2-hydroxy-3-(meth)acryloyloxypropyltrimethylammonium chloride.

In addition, each of the above-mentioned positively charged monomers may be used in the form of a hydrochloride.

As described above, the copolymer (P) to be used in the present invention contains the positively charged monomer excluding the formula (1a) as a constituent unit, and hence can improve the ability to be bonded or adsorbed onto a soft contact lens surface on the basis of the electrical interaction of the copolymer (P).

As the positively charged monomer excluding the formula (1a), any monomer having a primary amino group, monomer having a secondary amino group, monomer having a tertiary amino group, or monomer having a quaternary ammonium group may be used. Of those, from the viewpoint of improving the bonding or adsorption onto a soft contact lens surface and hydrophilicity, a monomer having a primary amino group, a monomer having a secondary amino group, or a monomer having a tertiary amino group is preferably used, and a monomer having a primary amino group is particularly preferably used.

Combinations of the monomers in the copolymer (P) to be used in the present invention are as described below, but are not particularly limited:

2-(meth)acryloyloxyethyl phosphorylcholine serving as the hydrophilic monomer, and aminoethyl (meth)acrylate hydrochloride serving as the positively charged monomer excluding the formula (1a);

2-(meth)acryloyloxyethyl phosphorylcholine serving as the hydrophilic monomer, and dimethylaminoethyl methacrylate serving as the positively charged monomer excluding the formula (1a); and 2-(meth)acryloyloxyethyl phosphorylcholine serving as the hydrophilic monomer, and 2-hydroxy-3-(meth)acryloyloxypropyltrimethylammonium chloride serving as the positively charged monomer excluding the formula (1a).

When any of the above-mentioned combinations is adopted as the monomers in the copolymer (P), firm bonding onto a soft contact lens surface can be simply formed through an electrical interaction, with the result that excellent hydrophilicity and sustainability thereof can be imparted.

The content of the positively charged monomer excluding the formula (1a) in the copolymer (P) is from 1 mol % to 50 mol %. The content of the positively charged monomer excluding the formula (1a) in the copolymer (P) is preferably 9.9 mol % or less, more preferably 7.5 mol % or less, still more preferably 2.0 mol % or more and 7.5 mol % or less.

[Other Monomer]

The copolymer (P) may contain a monomer other than the hydrophilic monomer and the positively charged monomer excluding the formula (1a) as long as the effect of the present invention is not impaired, but is preferably formed only of the hydrophilic monomer and the positively charged monomer excluding the formula (1a).

An example of the other monomer is a polymerizable monomer selected from a linear or branched alkyl (meth)acrylate, a cyclic alkyl (meth)acrylate, an aromatic group-containing (meth)acrylate, a styrene-based monomer, a vinyl ether monomer, a vinyl ester monomer, a hydrophilic hydroxy group-containing (meth)acrylate, an acid group-containing monomer, and a nitrogen-containing group-containing monomer.

Examples of the linear or branched alkyl (meth)acrylate include methyl (meth)acrylate, ethyl (meth)acrylate, propyl (meth)acrylate, butyl (meth)acrylate, lauryl (meth)acrylate, and stearyl (meth)acrylate.

An example of the cyclic alkyl (meth)acrylate is cyclohexyl (meth)acrylate.

Examples of the aromatic group-containing (meth)acrylate include benzyl (meth)acrylate and phenoxyethyl (meth)acrylate.

Examples of the styrene-based monomer include styrene, methylstyrene, and chlorostyrene.

Examples of the vinyl ether monomer include methyl vinyl ether and butyl vinyl ether.

Examples of the vinyl ester monomer include vinyl acetate and vinyl propionate.

Examples of the hydrophilic hydroxy group-containing (meth)acrylate include polyethylene glycol (meth)acrylate, polypropylene glycol (meth)acrylate, 2-hydroxyethyl (meth)acrylate, 2-hydroxybutyl (meth)acrylate, and 4-hydroxybutyl (meth)acrylate.

Examples of the acid group-containing monomer include (meth)acrylic acid, styrenesulfonic acid, and (meth)acryloyloxyphosphonic acid.

An example of the nitrogen-containing group-containing monomer is N-vinylpyrrolidone.

When the copolymer (P) contains the other monomer as a constituent unit, a molar ratio $[n_a/n_x]$ of the hydrophilic monomer (number of moles: $n_a$) to the other monomer (number of moles: $n_x$) is preferably 100/50 or less when the hydrophilic monomer is defined as 100. In addition, when the copolymer (P) contains the other monomer as a constituent unit, a molar ratio among the respective constituent units based on the hydrophilic monomer (number of moles: $n_a$), the positively charged monomer (number of moles: $n_b$), and the other monomer (number of moles: $n_x$) is preferably as follows: $n_a:n_b:n_x$=50 to 99:1 to 50:1 to 50.

[Weight-average Molecular Weight of Copolymer (P)]

The copolymer (P) has a weight-average molecular weight of from 10,000 to 5,000,000, preferably 11,000 or more, more preferably 12,000 or more, still more preferably 13,000 or more, and preferably 4,000,000 or less, more preferably 3,000,000 or less, still more preferably 2,000,000 or less, even more preferably 1,500,000 or less, particularly preferably 1,000,000 or less. The copolymer (P) may have a weight-average molecular weight of, for example, from 10,000 to 2,000,000, from 10,000 to 1,000,000, from 10,000 to 750,000, from 15,000 to 750,000, from 50,000 to 500,000, from 100,000 to 500,000, from 50,000 to 2,000,000, from 100,000 to 2,000,000, from 150,000 to 270,000, or from 13,000 to 1,000,000.

When the weight-average molecular weight is less than 10,000, the ability to be bonded or adsorbed onto a soft contact lens surface through an electrical interaction is reduced, and hence there is a risk in that excellent hydrophilicity and sustainability thereof may not be expected to be imparted to a soft contact lens surface. When the weight-average molecular weight is more than 5,000,000, there is a risk in that an increase in viscosity may cause difficulty in handling.

The weight-average molecular weight of the copolymer (P) refers to a value measured by gel permeation chromatography (GPC).

[Production Method for Copolymer (P)]

The copolymer (P) may be prepared by copolymerizing the above-mentioned monomers, and is generally a random copolymer. However, the copolymer (P) may be an alternate copolymer or block copolymer in which the monomers are regularly arranged, and may have a graft structure as a partial structure.

Specifically, the copolymer (P) may be obtained by, for example, subjecting a mixture of the above-mentioned monomers to radical polymerization in the presence of a radical polymerization initiator under an inert gas atmosphere, such as nitrogen, carbon dioxide, argon, and helium.

A method for the radical polymerization may be a known method, such as bulk polymerization, suspension polymerization, emulsion polymerization, or solution polymerization. The method for the radical polymerization is preferably solution polymerization from the viewpoint of purification or the like. The purification of the copolymer (P) may be performed by a known purification method, such as a reprecipitation method, a dialysis method, or an ultrafiltration method.

Examples of the radical polymerization initiator may include an azo-based radical polymerization initiator, an organic peroxide, and a persulfate.

Examples of the azo-based radical polymerization initiator include 2,2'-azobis(2-diaminopropyl) dihydrochloride, 2,2'-azobis(2-(5-methyl-2-imidazolin-2-yl)propane) dihydrochloride, 4,4'-azobis(4-cyanovaleric acid), 2,2'-azobisisobutyramide dihydrate, 2,2'-azobis(2,4-dimethylvaleronitrile), and 2,2'-azobisisobutyronitrile (AIBN).

Examples of the organic peroxide include t-butyl peroxyneodecanoate, benzoyl peroxide, diisopropyl peroxydicarbonate, t-butyl peroxy-2-ethylhexanoate, t-butyl peroxypivalate, t-butyl peroxyisobutyrate, lauroyl peroxide, t-butyl peroxydecanoate, and succinic acid peroxide.

Examples of the persulfate include ammonium persulfate, potassium persulfate, and sodium persulfate.

Those radical polymerization initiators may be used alone or in combination thereof.

The use amount of the polymerization initiator is generally from 0.001 part by mass to 10 parts by mass, preferably from 0.02 part by mass to 5.0 parts by mass, more preferably from 0.03 part by mass to 3.0 parts by mass with respect to 100 parts by mass in total of the monomers.

The synthesis of the copolymer (P) may be performed in the presence of a solvent. The solvent is not particularly limited as long as the solvent dissolves a composition of the monomers and does not adversely affect the reaction, and examples thereof may include water, an alcohol-based solvent, a ketone-based solvent, an ester-based solvent, a linear or cyclic ether-based solvent, and a nitrogen-containing solvent.

Examples of the alcohol-based solvent include methanol, ethanol, n-propanol, and isopropanol.

Examples of the ketone-based solvent include acetone, methyl ethyl ketone, and diethyl ketone.

An example of the ester-based solvent is ethyl acetate.

Examples of the linear or cyclic ether-based solvent include ethyl cellosolve and tetrahydrofuran.

Examples of the nitrogen-containing solvent include acetonitrile, nitromethane, and N-methylpyrrolidone.

Of those solvents, a mixed solvent of water and an alcohol is preferred.

[Concentration of Copolymer (P)]

In the treating solution for soft contact lenses of the present invention, the concentration of the copolymer (P) is 0.001 w/v % or more, preferably 0.002 w/v % or more, more preferably 0.003 w/v % or more, and is 15.0 w/v % or less, preferably 13.0 w/v % or less, more preferably 12.0 w/v % or less, still more preferably 10.0 w/v % or less. For example, in the treating solution for soft contact lenses of the present invention, the concentration of the copolymer (P) may be from 0.005 w/v % to 7.5 w/v %, or from 0.01 w/v % to 5.0 w/v %.

When the concentration of the copolymer (P) is less than 0.001 w/v %, the addition amount of the copolymer (P) is so small that the effect of imparting excellent hydrophilicity and sustainability thereof to soft contact lenses is not obtained. A concentration of more than 15.0 w/v % is economically disadvantageous because an effect commensurate with the blending amount is not obtained.

In the present invention, "w/v %" is the expression of the mass of a given component in 100 mL of a solution in grams (g). For example, the expression "a solution of the present invention contains 1.0 w/v % of the copolymer (P)" means that 100 mL of the solution contains 1.0 g of the copolymer (P).

[Other Components]

The treating solution for soft contact lenses of the present invention may further contain the following components as required in addition to the copolymer (P).

[Solvent]

The treating solution for soft contact lenses of the present invention may use water as a solvent, but other than water, may use any of alcohols, such as ethanol, n-propanol, and isopropanol.

Water to be generally used in the production of a pharmaceutical or a medical device may be used as the water to be used for the treating solution for soft contact lenses of the present invention. Specifically, ion-exchanged water, purified water, sterile purified water, distilled water, and water for injection may be used.

[Buffering Agent]

The treating solution for soft contact lenses of the present invention may contain a buffering agent. When the treating solution for soft contact lenses of the present invention contains a buffering agent, its pH and osmotic pressure can be adjusted, and besides, wearing sensation at the time of wearing soft contact lenses can be further improved.

In the present invention, from the viewpoint of obtaining the above-mentioned effects, one or more kinds selected from a phosphate buffer solution and a borate buffer solution may be used as the buffering agent.

Herein, the phosphate buffer solution is a buffer solution containing, for example, disodium hydrogen phosphate, sodium dihydrogen phosphate, sodium dihydrogen phosphate anhydride, potassium dihydrogen phosphate, dipotassium hydrogen phosphate, hydrochloric acid, sodium hydroxide, and potassium hydroxide. The borate buffer solution is a buffer solution containing, for example, boric acid, borax, hydrochloric acid, sodium hydroxide, and potassium hydroxide.

The concentration of the buffering agent in the treating solution for soft contact lenses of the present invention is preferably from 0.0001 w/v % to 15.0 w/v %, more preferably from 0.001 w/v % to 10.0 w/v %, still more preferably from 0.01 w/v % to 5.0 w/v %.

Particularly when one or more kinds selected from the phosphate buffer solution and the borate buffer solution are used as the buffering agent, the concentration thereof is preferably from 0.001 w/v % to 10.0 w/v %, more preferably from 0.01 w/v % to 5.0 w/v %, still more preferably from 0.1 w/v % to 5.0 w/v % in terms of the total of the components of the phosphate buffer solution and the borate buffer solution.

[Additive]

The treating solution for soft contact lenses of the present invention may further contain an additive as required.

Examples of the additive may include additives that have hitherto been used for soft contact lenses, such as vitamins, amino acids, sugars, cooling agents, inorganic salts, organic acid salts, acids, bases, antioxidants, stabilizing agents, and antiseptic agents.

Examples of the vitamin include flavin adenine dinucleotide sodium, cyanocobalamin, retinol acetate, retinol palmitate, pyridoxine hydrochloride, panthenol, sodium pantothenate, and calcium pantothenate.

Examples of the amino acid include aspartic acid and salts thereof, and aminoethylsulfonic acid.

Examples of the sugar include glucose, mannitol, sorbitol, xylitol, and trehalose.

Examples of the cooling agent include menthol and camphor.

Examples of the inorganic salt include sodium chloride, potassium chloride, magnesium chloride, and calcium chloride.

An example of the organic acid salt is sodium citrate.

Examples of the acid include phosphoric acid, citric acid, sulfuric acid, and acetic acid.

Examples of the base include tris-hydroxymethylaminomethane and monoethanolamine.

Examples of the antioxidant include tocopherol acetate and dibutylhydroxytoluene.

Examples of the stabilizing agent include sodium edetate and glycine.

Examples of the antiseptic agent include benzalkonium chloride, chlorhexidine gluconate, potassium sorbate, chlorobutanol, and polyhexanide hydrochloride.

Further, polyethylene glycol, a poloxamer, sodium alginate, hydroxypropyl methylcellulose, hydroxyethyl cellulose, sodium hyaluronate, sodium chondroitin sulfate, or the like may be used from the viewpoints of moisturizing soft contact lenses and improving wearing sensation.

Of those additives, from the viewpoint of adjusting the osmotic pressure of the treating solution for soft contact lenses to a suitable range, sodium chloride or potassium chloride as an inorganic salt is preferably added. The inorganic salt may be used as saline (e.g., ISO saline) together with a buffering agent.

From the viewpoint of further enhancing the effect of imparting hydrophilicity and sustainability thereof of the treating solution for soft contact lenses, it is preferred to add polyethylene glycol, sodium alginate, a poloxamer, hydroxypropyl methylcellulose, hydroxyethyl cellulose, sodium hyaluronate, or sodium chondroitin sulfate.

When the treating solution for soft contact lenses of the present invention contains the additive, the concentration thereof is preferably from 0.001 w/v % to 10.0 w/v %, more preferably from 0.001 w/v % to 7.0 w/v % in terms of the total of additive components.

In particular, when the treating solution for soft contact lenses of the present invention contains sodium chloride, the concentration thereof is preferably from 0.01 w/v % to 1.5 w/v %, more preferably from 0.05 w/v % to 1.3 w/v %, still more preferably from 0.1 w/v % to 1.0 w/v %.

Meanwhile, when the treating solution for soft contact lenses of the present invention contains potassium chloride, the concentration thereof is preferably from 0.01 w/v % to 4.0 w/v %, more preferably from 0.05 w/v % to 3.5 w/v %, still more preferably from 0.1 w/v % to 3.0 w/v %.

[Production Method for Treating Solution for Soft Contact Lenses]

The treating solution for soft contact lenses of the present invention may be produced by a general production method for a treating solution for contact lenses, involving mixing and stirring the copolymer (P) and other components as required. The obtained treating solution for soft contact lenses may be subjected to an operation such as aseptic filtration or autoclaving as required.

[pH of Treating Solution for Soft Contact Lenses]

The pH of the treating solution for soft contact lenses of the present invention is preferably from 3.0 to 8.0, more preferably from 3.5 to 7.8, still more preferably from 4.0 to 7.6, even more preferably from 4.5 to 7.5, from the viewpoint of improving wearing sensation.

Herein, the pH of the treating solution for soft contact lenses refers to a value measured in accordance with the Japanese Pharmacopoeia, Seventeenth Edition, General Tests, Processes and Apparatus, 2.54 pH Determination.

[Osmotic Pressure and Osmotic Pressure Ratio of Treating Solution for Soft Contact Lenses]

The osmotic pressure of the treating solution for soft contact lenses of the present invention is preferably from 200 mOsm to 400 mOsm, more preferably from 225 mOsm to 375 mOsm, still more preferably from 230 mOsm to 350 mOsm, even more preferably from 230 mOsm to 340 mOsm, from the viewpoint of improving wearing sensation. The osmotic pressure ratio is preferably from 0.7 to 1.4, more preferably from 0.7 to 1.3, still more preferably from 0.8 to 1.2.

Herein, the osmotic pressure of the treating solution for soft contact lenses refers to a value measured in accordance with the Japanese Pharmacopoeia, Seventeenth Edition, General Tests, Processes and Apparatus, 2.47 Osmolarity Determination, and the osmotic pressure ratio refers to a value obtained by dividing the obtained value of the osmotic pressure by the value of the osmotic pressure of 0.9 mass % saline (286 mOsm).

[Soft Contact Lenses and Constituent Components Thereof]

Soft contact lenses may be classified into the following four types according to the U.S. Food and Drug Administration (FDA): Group I, which includes "soft contact lenses each of which is nonionic and has a water content of less than 50%"; Group II, which includes "soft contact lenses each of which is nonionic and has a water content of 50% or more"; Group III, which includes "soft contact lenses each of which is ionic and has a water content of less than 50%"; and Group IV, which includes "soft contact lenses each of which is ionic and has a water content of 50% or more".

The treating solution for soft contact lenses of the present invention is preferably applied to soft contact lenses of Group IV from the viewpoint of imparting excellent hydrophilicity and sustainability thereof to a soft contact lens surface to further improve wearing sensation.

Specific examples of the soft contact lenses classified into Group IV include the following. (A numerical value in parentheses represents a water content, followed by a main constituent component of a soft contact lens.)

(Soft Contact Lenses of Group IV)

Etafilcon A (58%, 2-hydroxyethyl methacrylate/methacrylic acid), ocufilcon B (52%, 2-hydroxyethyl methacrylate/polyvinylpyrrolidone/methacrylic acid), ocufilcon D (55%, 2-hydroxyethyl methacrylate/polyvinylpyrrolidone/methacrylic acid), phemefilcon A (55%, 2-hydroxyethyl methacrylate/ethoxyethyl methacrylate/methacrylic acid), vifilcon A (55%, 2-hydroxyethyl methacrylate/polyvinylpyrrolidone/methacrylic acid), methafilcon A (55%, 2-hydroxyethyl methacrylate/methacrylic acid), bufilcon A (55%, 2-hydroxyethyl methacrylate/diacetone acrylamide/methacrylic acid), and perfilcon A (71%, 2-hydroxyethyl methacrylate/N-vinylpyrrolidone/methacrylic acid).

The present invention also encompasses a copolymer for a treating solution for soft contact lenses, which contains as constituent units 50 mol % to 99 mol % of a hydrophilic monomer represented by the formula (1a) and 1 mol % to 50 mol % of a positively charged monomer excluding the formula (1a), and has a weight-average molecular weight of from 10,000 to 5,000,000.

The copolymer may be used at a concentration of from 0.001 w/v % to 15.0 w/v % in a treating solution for soft contact lenses.

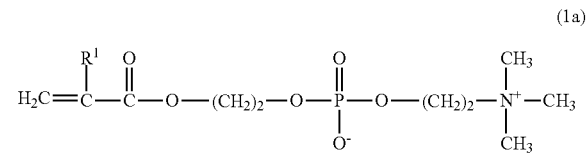

(1a)

In the general formula (1a), $R^1$ represents a hydrogen atom or a methyl group.

The present invention also encompasses a soft contact lens treatment method, including using a copolymer (P) that contains as constituent units 50 mol % to 99 mol % of a hydrophilic monomer represented by the formula (1a) and 1 mol % to 50 mol % of a positively charged monomer excluding the formula (1a), and that has a weight-average molecular weight of from 10,000 to 5,000,000.

The surface treatment method includes the following steps.

(I) A step of dissolving the copolymer (P) in a solvent that is water, or an alcohol, such as ethanol, n-propanol, or isopropanol, or a mixed solution thereof, at a concentration of from 0.001 w/v % to 15.0 w/v %. The solvent may contain the above-mentioned buffering agent and/or additive.

(II) A step of subjecting a soft contact lens to surface treatment with the solution obtained in the step (I).

Herein, a method for the surface treatment is not particularly limited as long as the surfaces of the soft contact lens can be coated with the copolymer (P) of the present invention, but for example, the soft contact lens may be immersed in the solution, or the solution may be sprayed onto the soft contact lens.

When the soft contact lens is immersed in the solution, an immersion time is not particularly limited, but may be, for example, 1 second or more, 10 seconds or more, 30 seconds or more, 1 minute or more, 5 minutes or more, 15 minutes or more, 30 minutes or more, 1 hour or more, or 2 hours or more.

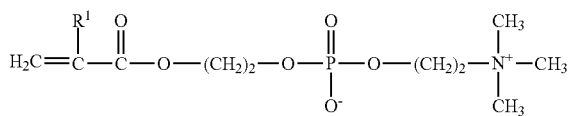

(1a)

In the general formula (1a), $R^1$ represents a hydrogen atom or a methyl group.

EXAMPLES

With regard to the present invention, the treating solution for soft contact lenses of the present invention is specifically described below by way of Examples and Comparative Examples. However, the present invention is not limited thereto. Copolymers and polymers used in Examples and Comparative Examples are as described below.

<Copolymer (P)>

The following copolymer (1) to copolymer (8) were each used as the copolymer (P).

Copolymer (1)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]$=92.5/7.5

Weight-average molecular weight: 200,000

Copolymer (2)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]$=95.0/5.0

Weight-average molecular weight: 210,000

Copolymer (3)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]$=97.5/2.5

Weight-average molecular weight: 230,000

Copolymer (4)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]$=95.0/5.0

Weight-average molecular weight: 270,000

Copolymer (5)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]$=95.0/5.0

Weight-average molecular weight: 150,000

Copolymer (6)

A 2-methacryloyloxyethyl phosphorylcholine/dimethylaminoethyl methacrylate copolymer was obtained using 2-(methacryloyloxy)ethyl 2-(trimethylammonio)ethylphosphate (synonym: 2-methacryloyloxyethylphosphorylcholine) as a hydrophilic monomer (number of moles: $n_a$) and dimethylaminoethyl methacrylate as a positively charged monomer (number of moles: $n_b$).

Ratio of monomers (molar ratio): $[n_a/n_b]$=95.0/5.0

Weight-average molecular weight: 220,000

Copolymer (7)

A 2-methacryloyloxyethyl phosphorylcholine/2-hydroxy-3-(meth)acryloyloxypropyltrimethyl ammonium chloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-hydroxy-3-methacryloyloxypropyltrimethylammonium chloride as a positively charged monomer (number of moles: $n_b$).

Ratio of monomers (molar ratio): $[n_a/n_b]$=95.0/5.0

Weight-average molecular weight: 210,000

Copolymer (8)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]$=60.0/40.0

Weight-average molecular weight: 205,000

<Measurement of Weight-average Molecular Weight>

5 mg of each of the obtained polymers was dissolved in 1 g of a 0.1 mol/L sodium sulfate aqueous solution, and the resultant solution was subjected to measurement. Other measurement conditions are as described below.

Column: Shodex (GSM-700)

Mobile phase: 0.1 mol/L sodium sulfate aqueous solution

Standard substance: pullulan

Detector: differential refractometer RI-8020 (manufactured by Tosoh Corporation)

Calculation method for weight-average molecular weight: molecular weight calculation program (GPC program for SC-8020)

Flow rate: 1.0 mL per minute
Injection volume: 100 μL
Column oven: 40° C.
Measurement time: 30 minutes <Polymer for Comparison>

The following polymers (A), (B), (C), and (D) were each used as a polymer for comparison to the copolymer (P).

Polymer (A)

A 2-methacryloyloxyethyl phosphorylcholine homopolymer (weight-average molecular weight: 200,000) was used.

Polymer (B)

A commercially available polydimethyldimethylenepyrrolidinium chloride solution (40% solution) (Polyquaternium-6, ME Polymer H40W (product name) manufactured by Toho Chemical Industry Co., Ltd., weight-average molecular weight: 250,000) was used.

Polymer (C)

A 2-methacryloyloxyethylene phosphorylcholine/methacrylic acid copolymer (molar ratio; 2-methacryloyloxyethyl phosphorylcholine:methacrylic acid=3:7) (weight-average molecular weight: 288,000) was used.

Polymer (D)

A 2-methacryloyloxyethyl phosphorylcholine/2-aminoethyl methacrylate hydrochloride copolymer was obtained using 2-(methacryloyloxy)ethyl 2-(trimethylammonio)ethylphosphate (synonym: 2-methacryloyloxyethyl phosphorylcholine) as a hydrophilic monomer (number of moles: $n_a$) and 2-aminoethyl methacrylate hydrochloride as a positively charged monomer (number of moles: $n_b$).

Ratio of monomers (molar ratio): $[n_a/n_b]=40.0/60.0$
Weight-average molecular weight: 234,000

<Adjustment of Concentrations of Copolymer (1) to Copolymer (8) and Polymer (A) to Polymer (D)>

The copolymer (1) to the copolymer (8) and the polymer (A) to the polymer (D) were subjected to the following concentration adjustment in advance for the purpose of facilitating the handling thereof in their use in Examples and Comparative Examples.

Copolymer (1) to copolymer (8): Each copolymer and purified water were used to adjust the concentration of the copolymer to 10 w/v %.

Polymer (A): The polymer (A) and purified water were used to adjust the concentration of the polymer (A) to 5 w/v %.

Polymer (B): The polymer (B) was a 40 w/v % solution, and was used as it was.

Polymer (C): The polymer (C) and purified water were used to adjust the concentration of the polymer (C) to 5 w/v %.

Polymer (D): The polymer (D) and purified water were used to adjust the concentration of the polymer (D) to 10 w/v %.

<Buffering Agent, Additive, and Water>
[ISO Saline containing Buffering Agent, Additive, and Water]

The following solution was used as the buffering agent, additive, and solvent of the treating solution for soft contact lenses of the present invention.

(Preparation of ISO Saline)

ISO saline was prepared in accordance with ISO 18369-3:2006, Ophthalmic Optics-Contact Lenses Part 3: Measurement Methods.

Specifically, 8.3 g of sodium chloride, 5.993 g of sodium hydrogen phosphate dodecahydrate, and 0.528 g of sodium dihydrogen phosphate dihydrate were dissolved in water, the total amount of the solution was adjusted to 1,000 mL, and the solution was filtered to provide ISO saline.

The sodium chloride used was a product of Kishida Chemical Co., Ltd., the sodium hydrogen phosphate dodecahydrate used was a product of Wako Pure Chemical Industries, Ltd., the sodium dihydrogen phosphate dihydrate used was a product of Wako Pure Chemical Industries, Ltd., and the water used was ion-exchanged water.

<Water Breaking Up Time (WBUT) Test of Soft Contact Lens>

A WBUT test of a soft contact lens was performed in accordance with the following procedure.

(1) 10 mL or more of the ISO saline was placed in a 15 mL centrifuge tube, and one soft contact lens (1 day aquair, manufactured by CooperVision Japan, ocufilcon D) was taken out of a blister pack and placed in the 15 mL centrifuge tube, followed by shaking for 2 hours.

(2) The ISO saline in the centrifuge tube was removed, and 10 mL or more of ISO saline was placed therein again, followed by shaking overnight.

(3) The soft contact lens was removed from the 15 mL centrifuge tube, water was gently wiped off, and the soft contact lens was placed in a contact lens case. 1 mL of the treating solution for soft contact lenses of each Example or each Comparative Example was placed therein, and autoclave treatment (121° C., 20 minutes) was performed.

(4) The soft contact lens was picked up with tweezers and slowly lifted.

(5) Measurement of time was started at a time point when the lifted soft contact lens was lifted to a height free of contact with a liquid surface.

(6) At a time point when a liquid film formed on the soft contact lens surface was broken up, the measurement of time was recorded, and the recorded time was defined as a WBUT before cleaning by digital rubbing.

(7) After that, the soft contact lens was placed on a forefinger, and subjected to cleaning by 20 times of digital rubbing using a thumb and the forefinger.

(8) After the cleaning by digital rubbing, the soft contact lens was immersed in ISO saline through the use of tweezers.

(9) The procedure of (4), (5), and (6) was performed again to measure a WBUT after cleaning by digital rubbing.

Each measurement was repeated 3 times, and respective average values were evaluated as a WBUT (before cleaning by digital rubbing) and a WBUT (after cleaning by digital rubbing). A larger numerical value of WBUT indicates more satisfactory hydrophilicity.

WBUT: A WBUT of 3 seconds or more was judged as having surface hydrophilicity, a WBUT of 5 seconds or more was judged as having excellent surface hydrophilicity, and a WBUT of 7 seconds or more was judged as having extremely excellent surface hydrophilicity.

<Cytotoxicity Test using Rabbit Corneal Epithelial Cells (SIRC Cells)>

A cytotoxicity test using SIRC cells was performed with reference to ISO 10993-5:2009 and N. Tani et al. Toxicology in vitro 13 (1999) 175-187, and a cell survival rate was measured and evaluated.

Preparation of Medium for SIRC Cell Culture 5 mL of an antibiotic-antimycotic solution (100×) was added to a 500 mL bottle of Dulbecco's modified Eagle's medium (DMEM). Subsequently, 50 mL of sterilized fetal bovine serum (FBS, inactivated) was thawed at 4° C. and then added, to provide a medium for cell culture.

The Dulbecco's modified Eagle's medium (DMEM) used was a product of Sigma-Aldrich Japan G.K., the antibiotic-antimycotic (100×) used was penicillin/streptomycin (100×) (manufactured by Sigma-Aldrich Japan G.K.), and the sterilized fetal bovine serum (FBS) used was a product of Nippon Bio-Test Laboratories Inc.

Culture of SIRC Cells 9 mL of the medium for cell culture and 1 mL of a suspension of cells were added to a sterile petri dish, and the cells were grown by culture in a $CO_2$ incubator for 48 hours or more. The cells in the petri dish were observed with a microscope to confirm the increase of the number of cells and the state of the cells (whether the cells were not killed or floating without adhering).

Seeding of Cells

The concentration of the cell suspension was adjusted to a concentration of $1\times10^5$ cells/mL through the use of the medium for cell culture. The concentration-adjusted cell suspension was dispensed into a 96-well plate at 100 μL/well with a micropipette, and cultured in a $CO_2$ incubator for 24 hours.

Preparation of Test Substance

A 10 w/v % solution of each copolymer or sodium lauryl sulfate (SDS) for biochemistry serving as a positive control was dissolved in the medium for cell culture. The prepared test substance was serially diluted on a 96-well plate to 100 w/v %, 75 w/v %, 50 w/v %, 25 w/v %, 12.5 w/v %, and 0 w/v %, and the resultant was subjected to evaluation.

The sodium lauryl sulfate for biochemistry used was a product of Wako Pure Chemical Industries, Ltd., and the Dulbecco's phosphate buffered saline used was a product of Sigma-Aldrich Japan G.K.

Exposure to Test Substance

The medium for SIRC cell culture was removed from the 96-well plate, and the test substance prepared in the foregoing was added at 200 μL/well to the 96-well plate in which the cells had been cultured for 24 hours. The cells were exposed to the test substance in a $CO_2$ incubator for 24 hours.

Cytotoxicity Evaluation by Neutral Red (NR) Method

NR was dissolved in ion-exchanged water at 5 mg/mL to give a NR stock solution. The NR stock solution was diluted 100-fold with the medium for cell culture to provide a NR medium. The 96-well plate in which the cells had been exposed to the test substance was taken out, and the medium was removed. Subsequently, the NR medium was added at 100 μL/well, followed by culture in a $CO_2$ incubator for 3 hours to cause the cells to incorporate NR.

The 96-well plate was taken out of the $CO_2$ incubator and the NR medium was removed. 100 μL/well of PBS was added, and then, after the PBS had been removed, a NR extractant obtained by mixing ethanol, ion-exchanged water, and acetic acid at ratios of 50 mass %, 49 mass %, and 1 mass %, respectively was added at 100 μL/well with a micropipette. The whole was stirred with a shaking machine for 5 minutes to extract NR from the cells, and an absorbance at 540 nm was measured with a plate reader.

The contact concentration of SDS at which the cell survival rate became 50% was confirmed to be about 0.01 mass %, and a cell survival rate after test substance treatment and a $IC_{50}$ value were calculated from the following equations.

The neutral red used was a product of Wako Pure Chemical Industries, Ltd.

Cell survival rate (%)=(absorbance after test substance treatment−absorbance of blank)/(absorbance after medium treatment−absorbance of blank)×100

$IC_{50}$ value=$10^{\wedge}(\log_{10}(A/B)\times(50-C)/(D-C)+\log_{10}(B))$

A: High test substance concentration (w/v %) across cell survival rate of 50%

B: Low test substance concentration (w/v %) across cell survival rate of 50%

C: Cell survival rate at B

D: Cell survival rate at A

The following criteria were set as criteria for determining safety.

$IC_{50}$ value of 50 or more: Extremely excellent safety is shown.

$IC_{50}$ value of from 40 to 50: Excellent safety is shown.

$IC_{50}$ value of from 10 to 40: There is no problem with safety.

$IC_{50}$ value of from 0 to 10: A more detailed safety test is required.

Example 1

2 mL of a 10 w/v % solution of the copolymer (1) was added to about 80 mL of ISO saline and dissolved therein by stirring. To the resultant solution, ISO saline was added to a total amount of 100 mL to prepare a treating solution for soft contact lenses, which was defined as Example 1 (pure content concentration of the copolymer (1): 0.2 w/v %).

The WBUT test of a soft contact lens was performed using Example 1. The results are shown in Table 1.

Example 2 to Example 10 and Comparative Example 1 to Comparative Example 6

Treating solutions for soft contact lenses of Example 2 to Example 10 and Comparative Example 1 to Comparative Example 6 were each prepared in the same manner as in Example 1 except that a blend shown in Table 1 and Table 2 was adopted.

The WBUT test of a soft contact lens was performed using each of the prepared Examples and Comparative Examples. The results are shown in Table 1 and Table 2.

TABLE 1

| | Blended component | Example 1 | Example 2 | Example 3 | Example 4 | Example 5 | Example 6 | Example 7 | Example 8 |
|---|---|---|---|---|---|---|---|---|---|
| Copolymer (P) | Solution of copolymer (1) (mL) | 2.0 | 0.5 | 10.0 | | | | | |
| | Solution of copolymer (2) (mL) | | | | 2.0 | | | | |
| | Solution of copolymer (3) (mL) | | | | | 2.0 | | | |
| | Solution of copolymer (4) (mL) | | | | | | 2.0 | | |

TABLE 1-continued

| Blended component | | Example 1 | Example 2 | Example 3 | Example 4 | Example 5 | Example 6 | Example 7 | Example 8 |
|---|---|---|---|---|---|---|---|---|---|
| Copolymer (P) | Solution of copolymer (5) (mL) | | | | | | | 2.0 | |
| | Solution of copolymer (6) (mL) | | | | | | | | 2.0 |
| | Solution of copolymer (7) (mL) | | | | | | | | |
| | Solution of copolymer (8) (mL) | | | | | | | | |
| Polymer different from (P) | Solution of polymer (A) (mL) | | | | | | | | |
| | Solution of polymer (B) (mL) | | | | | | | | |
| | Solution of polymer (C) (mL) | | | | | | | | |
| | Solution of polymer (D) (mL) | | | | | | | | |
| Other component | ISO saline | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL |
| Evaluation result | Pure content concentration of polymer (w/v %) | 0.2 | 0.05 | 1.0 | 0.2 | 0.2 | 0.2 | 0.2 | 0.2 |
| | Appearance and properties | Colorless and clear | Colorless and clear | Colorless and clear | Colorless and clear | Colorless and clear | Colorless and clear | Colorless and clear | Colorless and clear |
| | WBUT evaluation (before cleaning by digital rubbing) | 7.5 | 6.1 | 8.5 | 7.6 | 7.5 | 7.7 | 7.5 | 6.3 |
| | WBUT evaluation (after cleaning by digital rubbing) | 6.8 | 5.3 | 7.6 | 6.9 | 6.8 | 6.5 | 6.6 | 5.4 |

TABLE 2

| Blended component | | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|
| Copolymer (P) | Solution of copolymer (1) (mL) | | | | | | | | |
| | Solution of copolymer (2) (mL) | | | | | | | | |
| | Solution of copolymer (3) (mL) | | | | | | | | |
| | Solution of copolymer (4) (mL) | | | | | | | | |
| | Solution of copolymer (5) (mL) | | | | | | | | |
| | Solution of copolymer (6) (mL) | | | | | | | | |
| | Solution of copolymer (7) (mL) | 2.0 | | | | | | | |
| | Solution of copolymer (8) (mL) | | 2.0 | | | | | | |
| Polymer different from (P) | Solution of polymer (A) (mL) | | | 4.0 | 1.0 | 20.0 | | | |
| | Solution of polymer (B) (mL) | | | | | | 0.5 | | |
| | Solution of polymer (C) (mL) | | | | | | | 4.0 | |
| | Solution of polymer (D) (mL) | | | | | | | | 2.0 |
| Other component | ISO saline | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL |
| Evaluation result | Pure content concentration of polymer (w/v %) | 0.2 | 0.2 | 0.2 | 0.05 | 1.0 | 0.2 | 0.2 | 0.2 |
| | Appearance and properties | Colorless and clear | Colorless and clear | Colorless and clear | Colorless and clear | Colorless and clear | Colorless and clear | Colorless and clear | Colorless and clear |
| | WBUT evaluation (before cleaning by digital rubbing) | 6.2 | 6.5 | 1.8 | 0.7 | 0.9 | 2.0 | 2.1 | 2.3 |

TABLE 2-continued

| Blended component | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|
| WBUT evaluation (after cleaning by digital rubbing) | 5.2 | 5.6 | 0.7 | 0.7 | 0.7 | 0.6 | 0.6 | 1.4 |

As apparent from the results of Table 1 and Table 2, in Example 1 to Example 10, high WBUT values of from 6.1 to 8.5 in the WBUT evaluation (before cleaning by digital rubbing), and of from 5.2 to 7.6 in the WBUT evaluation (after cleaning by digital rubbing) were shown. Meanwhile, in Comparative Example 1 to Comparative Example 6, low WBUT values of from 0.7 to 2.3 in the WBUT evaluation (before cleaning by digital rubbing), and of from 0.6 to 1.4 in the WBUT evaluation (after cleaning by digital rubbing) were shown.

As apparent from the foregoing, the soft contact lenses treated with the treating solutions for soft contact lenses containing the copolymers (1) to (8) each showed excellent hydrophilicity both before and after cleaning by digital rubbing. Thus, it was confirmed that the treating solutions for soft contact lenses containing the copolymers (1) to (8) were each capable of imparting hydrophilicity excellent in sustainability.

Example 11 to Example 18

Next, for the purpose of evaluating the safety of the copolymer (P), the cytotoxicity test using SIRC cells (Example 11 to Example 18) was performed. The results are shown in Table 3.

TABLE 3

| Example | Test substance | | $IC_{50}$ |
|---|---|---|---|
| Example 11 | Copolymer (P) | Solution of copolymer (1) | 54.7 |
| Example 12 | | Solution of copolymer (2) | 58.0 |
| Example 13 | | Solution of copolymer (3) | 62.8 |
| Example 14 | | Solution of copolymer (4) | 55.4 |
| Example 15 | | Solution of copolymer (5) | 58.7 |
| Example 16 | | Solution of copolymer (6) | 45.2 |
| Example 17 | | Solution of copolymer (7) | 40.1 |
| Example 18 | | Solution of copolymer (8) | 47.3 |

As apparent from the results of Table 3, all of the copolymer (1) to the copolymer (8) were found to show excellent safety, and of those, the copolymer (1) to the copolymer (5) showed extremely excellent safety.

Example 19 to Example 26

Treating solutions for soft contact lenses of Example 19 to Example 26 were each prepared in the same manner as in Example 1 except that a blend shown in Table 4 was adopted. The WBUT test of a soft contact lens was performed using each of the prepared Examples and Comparative Examples. The results are shown in Table 4.

TABLE 4

| | Blended component | Example 19 | Example 20 | Example 21 | Example 22 | Example 23 | Example 24 | Example 25 | Example 26 |
|---|---|---|---|---|---|---|---|---|---|
| Copolymer (P) | Solution of copolymer (1) (mL) | 2.0 | | | | | | | |
| | Solution of copolymer (2) (mL) | | 2.0 | | | | | | |
| | Solution of copolymer (3) (mL) | | | 2.0 | | | | | |
| | Solution of copolymer (4) (mL) | | | | 2.0 | | | | |
| | Solution of copolymer (5) (mL) | | | | | 2.0 | | | |
| | Solution of copolymer (6) (mL) | | | | | | 2.0 | | |
| | Solution of copolymer (7) (mL) | | | | | | | 2.0 | |
| | Solution of copolymer (8) (mL) | | | | | | | | 2.0 |
| Other component | Sodium chloride (g) | 0.75 | 0.1 | 0.15 | 0.8 | 0.93 | | 0.35 | 0.1 |
| | Potassium chloride (g) | 3 | 0.53 | 0.1 | | | 1.15 | 0.35 | 0.53 |
| | Boric acid (g) | 0.4 | 0.4 | 1.6 | | | | | 0.4 |
| | Borax (g) | 0.015 | | 0.059 | 0.4 | | | | |
| | Sodium hydroxide (g) | | 0.0072 | | | | | | 0.0072 |
| | Sodium dihydrogen phosphate (g) | | | | | 0.077 | 0.015 | 0.254 | |
| | Disodium hydrogen phosphate (g) | | | | | 0.386 | 0.508 | 0.043 | |
| | Polyethylene glycol (g) | | | | | | | 0.1 | 0.1 |
| | Sodium alginate (g) | | | | | | 0.1 | | |
| | Poloxamer (g) | | | | | 0.1 | | | |
| | Hydroxypropyl methylcellulose (g) | | | | 0.1 | | | | |
| | Hydroxyethyl cellulose (g) | | | 0.1 | | | | | |
| | Sodium hyaluronate (g) | | 0.1 | | | | | | |
| | Sodium chondroitin sulfate (g) | 0.1 | | | | | | | |
| | Water | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL | Total amount is adjusted to 100 mL |

TABLE 4-continued

| Blended component | | Example 19 | Example 20 | Example 21 | Example 22 | Example 23 | Example 24 | Example 25 | Example 26 |
|---|---|---|---|---|---|---|---|---|---|
| Evaluation result | Pure content concentration of copolymer (P) (w/v %) | 0.2 | 0.2 | 0.2 | 0.2 | 0.2 | 0.2 | 0.2 | 0.2 |
| | Appearance and properties | Colorless and clear | Colorless and clear | Colorless and clear | Colorless and clear | Colorless and clear | Colorless and clear | Colorless and clear | Colorless and clear |
| | pH | 7.0 | 7.2 | 7.0 | 4.9 | 7.2 | 8.0 | 5.8 | 7.2 |
| | Osmotic pressure (mOsm) | 335 | 241 | 339 | 339 | 338 | 329 | 234 | 241 |
| | Osmotic pressure ratio | 1.17 | 0.84 | 1.19 | 1.19 | 1.18 | 1.15 | 0.82 | 0.84 |
| | WBUT evaluation (before cleaning by digital rubbing) | 10.5 | 10.8 | 10.6 | 10.7 | 10.5 | 9.4 | 9.2 | 8.9 |
| | WBUT evaluation (after cleaning by digital rubbing) | 9.8 | 9.7 | 9.5 | 9.6 | 9.8 | 8.1 | 8.3 | 7.9 |

The sodium chloride used was a product of Otsuka Pharmaceutical Co., Ltd., the potassium chloride used was a product of Nichi-Iko Pharmaceutical Co., Ltd., the boric acid used was a product of Wako Pure Chemical Industries, Ltd., the borax used was a product of Wako Pure Chemical Industries, Ltd., the sodium hydrogen phosphate used was a product of Wako Pure Chemical Industries, Ltd., the sodium dihydrogen phosphate used was a product of Wako Pure Chemical Industries, Ltd., the polyethylene glycol used was Macrogol 4000 (manufactured by NOF Corporation), the poloxamer used was Unilube 70DP-950B (manufactured by NOF Corporation), the sodium alginate used was a product of Wako Pure Chemical Industries, Ltd., the hydroxypropyl methylcellulose used was a product of 60SH-50, manufactured by Shin-Etsu Chemical Co., Ltd., the hydroxyethyl cellulose used was SE900, manufactured by Daicel Fine-Chem Ltd., the sodium chondroitin sulfate used was a product of Sigma-Aldrich Japan G. K., the sodium hyaluronate used was a product of Sigma-Aldrich Japan G.K., and the water used was ion-exchanged water.

As apparent from the results of Table 4, high WBUT values of from 8.9 to 10.8 in the WBUT evaluation (before cleaning by digital rubbing), and of from 7.9 to 9.8 in the WBUT evaluation (after cleaning by digital rubbing) were shown.

As apparent from the foregoing, the soft contact lenses treated with the treating solutions for soft contact lenses containing the copolymers (1) to (8) and the additives each showed excellent hydrophilicity both before and after cleaning by digital rubbing. Thus, it was confirmed that the treating solutions for soft contact lenses containing the copolymers (1) to (8) and the additives were each capable of imparting hydrophilicity excellent in sustainability.

As apparent from the results of Table 1 to Table 4, the use of the treating solution for soft contact lenses using the copolymer of the present invention is excellent in safety, and besides, can impart excellent hydrophilicity and sustainability thereof to a soft contact lens surface.

In addition, when the treating solution for soft contact lenses of the present invention contained, as another component (additive), polyethylene glycol, sodium alginate, a poloxamer, hydroxypropyl methylcellulose, hydroxyethyl cellulose, sodium hyaluronate, or sodium chondroitin sulfate, the hydrophilicity and sustainability thereof were further enhanced.

INDUSTRIAL APPLICABILITY

The use of the copolymer excellent in safety of the present invention can impart excellent hydrophilicity and sustainability thereof to a soft contact lens surface, and can provide a treating solution for soft contact lenses excellent in wearing sensation.

The invention claimed is:

1. A soft contact lens treatment method, comprising subjecting a soft contact lens to surface treatment with a treating solution containing a copolymer (P) consisting of a combination of 50 mol % to 99 mol % of a hydrophilic monomer represented by the formula (1a) and 1 mol % to 50 mol % of 2-aminoethyl methacrylate hydrochloride, and that has a weight-average molecular weight of from 10,000 to 5,000,000:

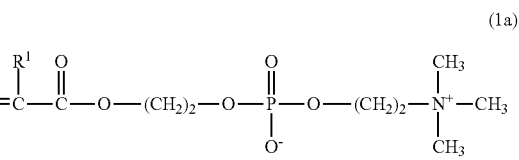

(1a)

in the formula (1a), $R^1$ represents a hydrogen atom or a methyl group.

2. The soft contact lens treatment method according to claim 1, wherein the treating solution for soft contact lenses is a shipping solution for soft contact lenses.

3. The soft contact lens treatment method according to claim 1, wherein the treating solution for soft contact lenses is a care product for soft contact lenses.

4. The soft contact lens treatment method according to claim 1, wherein the copolymer (P) contains as constituent units 92.5 mol % to 99 mol % of a hydrophilic monomer represented by the formula (1a) and 1 mol % to 7.5 mol % of 2-aminoethyl methacrylate hydrochloride.

* * * * *